United States Patent
Hall

(10) Patent No.: US 11,774,769 B2
(45) Date of Patent: *Oct. 3, 2023

(54) DEPTH MEASUREMENT USING A PULSED STRUCTURED LIGHT PROJECTOR

(71) Applicant: META PLATFORMS TECHNOLOGIES, LLC, Menlo Park, CA (US)

(72) Inventor: Michael Hall, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 17/173,341

(22) Filed: Feb. 11, 2021

(65) Prior Publication Data
US 2021/0165233 A1 Jun. 3, 2021

Related U.S. Application Data

(63) Continuation of application No. 15/695,840, filed on Sep. 5, 2017, now Pat. No. 10,962,790.

(51) Int. Cl.
*G01B 5/14* (2006.01)
*G02B 27/01* (2006.01)
(Continued)

(52) U.S. Cl.
CPC ....... *G02B 27/0176* (2013.01); *G01B 5/0014* (2013.01); *G01B 11/22* (2013.01);
(Continued)

(58) Field of Classification Search
CPC ........ G02B 27/0176; G02B 2027/0138; G06T 7/507; G06T 19/006; H04N 13/25; G01B 5/0014; G01B 11/22; G01B 11/2513
See application file for complete search history.

(56) References Cited

U.S. PATENT DOCUMENTS

| 3,947,119 A | 3/1976 | Bamberg et al. |
| 2004/0037450 A1 | 2/2004 | Bradski |

(Continued)

FOREIGN PATENT DOCUMENTS

CN 105143817 A 12/2015

OTHER PUBLICATIONS

Chinese National Intellectual Property Administration, Office Action, Chinese Application No. 201811026838.2, dated Mar. 24, 2020, 15 pages.

*Primary Examiner* — Dave Czekaj
*Assistant Examiner* — Berteau Joisil
(74) *Attorney, Agent, or Firm* — Fenwick & West LLP

(57) ABSTRACT

A depth measurement assembly (DMA) includes a pulsed illuminator assembly, a depth camera assembly, and a controller. The pulsed illuminator assembly has a structured light projector that projects pulses of structured light at a pulse rate into a local area. The depth camera assembly captures images data of an object in the local area illuminated with the pulses of structured light. An exposure interval of the depth camera assembly is pulsed and synchronized to the pulses projected by the pulsed illuminator assembly. The controller controls the pulsed illuminator assembly and the depth camera assembly so that they are synchronized. The controller also determine depth and/or tracking information of the object based on the captured image data. In some embodiments, the pulsed illuminator assembly have a plurality of structured light projectors that projects pulses of structured light at different times.

20 Claims, 8 Drawing Sheets

(51) Int. Cl.
  *G01B 5/00*     (2006.01)
  *G01B 11/25*    (2006.01)
  *G06T 7/507*    (2017.01)
  *H04N 13/25*    (2018.01)
  *G01B 11/22*    (2006.01)
  *G06T 19/00*    (2011.01)

(52) U.S. Cl.
  CPC .......... *G01B 11/2513* (2013.01); *G06T 7/507* (2017.01); *H04N 13/25* (2018.05); *G02B 2027/0138* (2013.01); *G06T 19/006* (2013.01)

(56) References Cited

U.S. PATENT DOCUMENTS

| | | | |
|---|---|---|---|
| 2005/0023356 A1 | 2/2005 | Wiklof et al. | |
| 2006/0118627 A1 | 6/2006 | Joseph et al. | |
| 2011/0310226 A1 | 12/2011 | McEldowney | |
| 2014/0320605 A1 | 10/2014 | Johnson | |
| 2015/0288955 A1* | 10/2015 | Perry | G01S 7/497 |
| | | | 348/187 |
| 2016/0182889 A1* | 6/2016 | Olmstead | G01B 11/2513 |
| | | | 348/47 |
| 2016/0223656 A1* | 8/2016 | Hall | G01B 11/14 |

* cited by examiner

DEPTH MEASUREMENT USING A PULSED STRUCTURED LIGHT PROJECTOR

CROSS REFERENCE TO RELATED APPLICATIONS

This application is a continuation of co-pending U.S. application Ser. No. 15/695,840, filed Sep. 5, 2017, which is incorporated by reference in its entirety.

BACKGROUND

The present disclosure generally relates to depth measurement, and specifically relates to using a pulsed structured light projector for depth measurement in head-mounted display (HMD) applications.

Depth measurement is an important feature for HMD systems, such as systems used in virtual reality (VR) and augmented reality (AR) applications. Depth measurements systems typically include some sort of active illumination system that projects light into a local area (e.g., structured light, and light pulse, etc.). The depth measurement system then uses images of the local area that include the projected light in order to determine depth to objects in the local area. But, existing depth measurement systems have a drawback of poor performance under high ambient lighting conditions, because the active illumination system has to generate a signal that is strong enough for depth measurement system to distinguish it ambient background light. Accordingly, effectiveness of conventional depth measurement systems is impaired under high ambient lighting, such as outdoor under bright solar illumination.

SUMMARY

A depth measurement assembly (DMA) projects pulses of structured light into a local area (e.g., an area surrounding a HMD). The DMA captures image data of the local area that include the structured light that has been scattered/reflected by objects in the local area, and uses the captured image data to determine depth information for the objects in the local area. In some embodiments, one or more of the pulses are high-peak-power pulses that can overwhelm strong ambient light. Thus, the high-peak-power pulses can increase the signal-to-noise ratio in conditions with strong ambient light.

The DMA includes a pulsed illuminator assembly, a depth camera assembly, and a controller. The pulsed illuminator assembly includes a structured light projector that projects the pulses of structured light at a pulse rate into a portion of the local area. The depth camera assembly captures image data of the portion of the local area illuminated with the pulses of structured light. The depth camera assembly has pulsed exposure intervals synchronized to the pulse rate of the structured light projector. For example, for each pulse of structured light, the depth camera assembly captures image data during a time period equal to or longer than a duration of the pulse. Outside the time period, the depth camera assembly does not capture image data. The controller controls the pulsed illuminator assembly and the depth camera assembly. Also, the controller determines depth information of objects in the portion of the local area based in part on the image data captured by the depth camera assembly.

In some embodiments, the DMA is part of a HMD. The HMD system may operate in a VR system environment, an AR system environment, a mixed reality (MR) system environment, or some combination thereof. The HMD comprises an electronic display, an optics block, and the DMA. The electronic display displays a virtual object based in part on the depth information. The optics block directs light from the electronic display element to an eyebox of the HMD.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
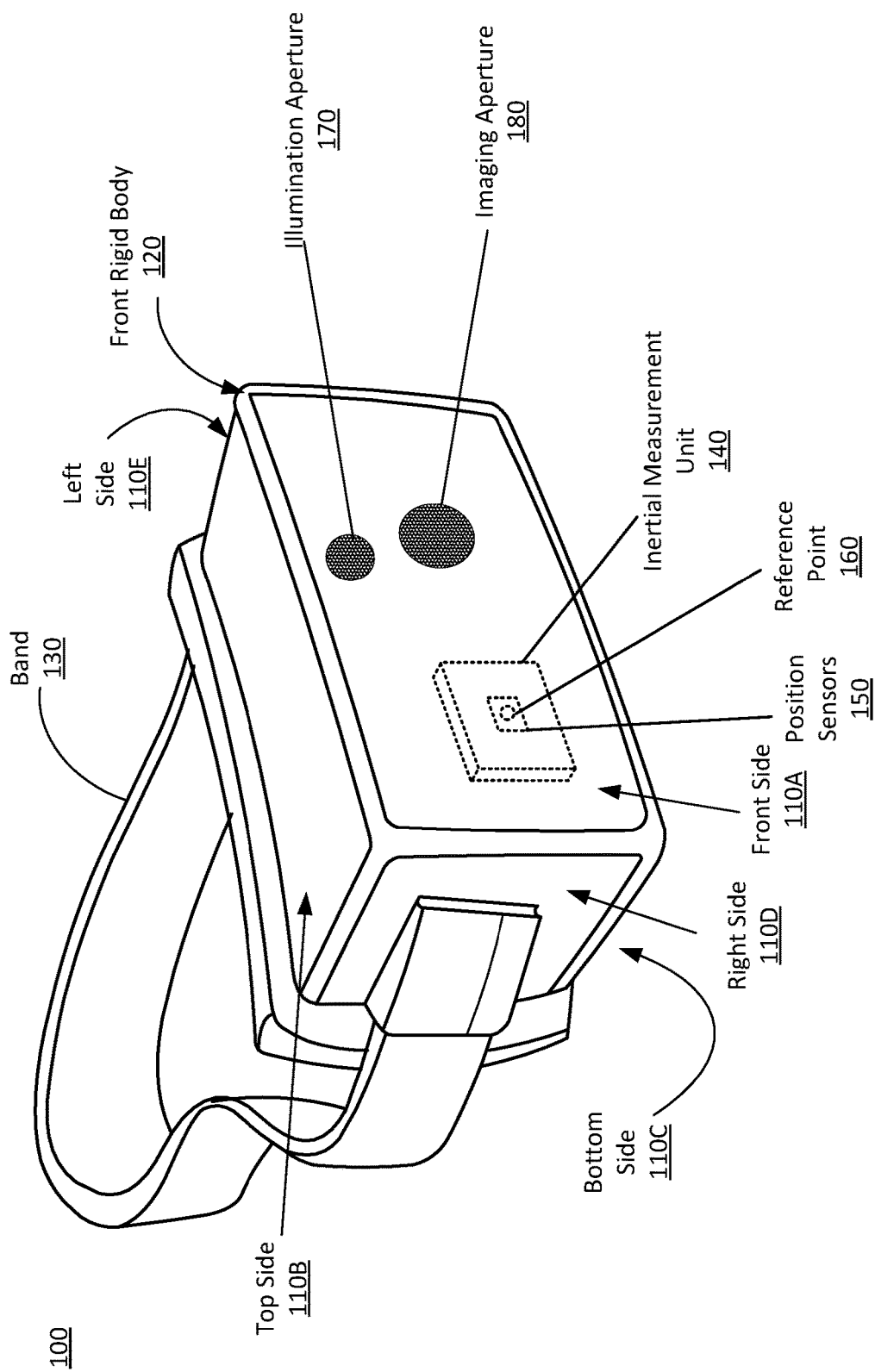
FIG. 1 is a wire diagram of a HMD, in accordance with an embodiment.

FIG. 1 is a wire diagram of a HMD 100, in accordance with an embodiment. The HMD 100 may be part of, e.g., a VR system, an AR system, a MR system, or some combination thereof. In embodiments that describe AR system and/or a MR system, portions of the HMD 100 that are between a front side 110A of the HMD 100 and an eye of the user are at least partially transparent (e.g., a partially transparent electronic display). The HMD 100 includes a front side 110A, a top side 110B, a bottom side 110C, a right side 110D, a left side 110E, a front rigid body 120, and a band 130. The front rigid body 120 also includes an inertial measurement unit (IMU) 140, the one or more position sensors 150, and a reference point 160. In the embodiment shown by FIG. 1, the position sensors 150 are located within the IMU 140, and neither the IMU 140 nor the position sensors 150 are visible to the user.

The IMU 140 is an electronic device that generates fast calibration data based on measurement signals received from one or more of the position sensors 150. A position sensor 150 generates one or more measurement signals in response to motion of the HMD 100. Examples of position sensors 150 include: one or more accelerometers, one or more gyroscopes, one or more magnetometers, another suitable type of sensor that detects motion, a type of sensor used for error correction of the IMU 140, or some combination thereof. The position sensors 150 may be located external to the IMU 140, internal to the IMU 140, or some combination thereof.

Based on the one or more measurement signals from one or more position sensors 150, the IMU 140 generates fast calibration data indicating an estimated position of the HMD 100 relative to an initial position of the HMD 100. For example, the position sensors 150 include multiple accelerometers to measure translational motion (forward/back, up/down, left/right) and multiple gyroscopes to measure rotational motion (e.g., pitch, yaw, or roll). In some embodiments, the IMU 140 rapidly samples the measurement signals and calculates the estimated position of the HMD 100 from the sampled data. For example, the IMU 140 integrates the measurement signals received from the accelerometers over time to estimate a velocity vector and integrates the velocity vector over time to determine an estimated position of a reference point on the HMD 100. The reference point 160 is a point that may be used to describe the position of the HMD 100. While the reference point may generally be defined as a point in space; however, in practice the reference point is defined as a point within the HMD 100 (e.g., a center of the IMU 140).

The HMD 100 also includes a DMA (not show in FIG. 1). Some embodiments of the DMA include a pulsed illuminator assembly and a depth camera assembly. The pulsed illuminator assembly projects pulses of structured light towards an object in a local area surrounding the HMD 100. The depth camera assembly collects the pulses of structured light reflected from the object and may also collect ambient light reflected from the object to capture image data. Based on the captured image data, the DMA determines depth information of the object. The HMD 100 depicts an illumination aperture 170 and an imaging aperture 180. The pulsed illuminator assembly projects the pulses of structured light through the illumination aperture 170. And the depth camera assembly collects the pulses of structured light reflected from the object through the image aperture 180. More details about the DMA are described in conjunction with FIG. 3.

Figure 2:
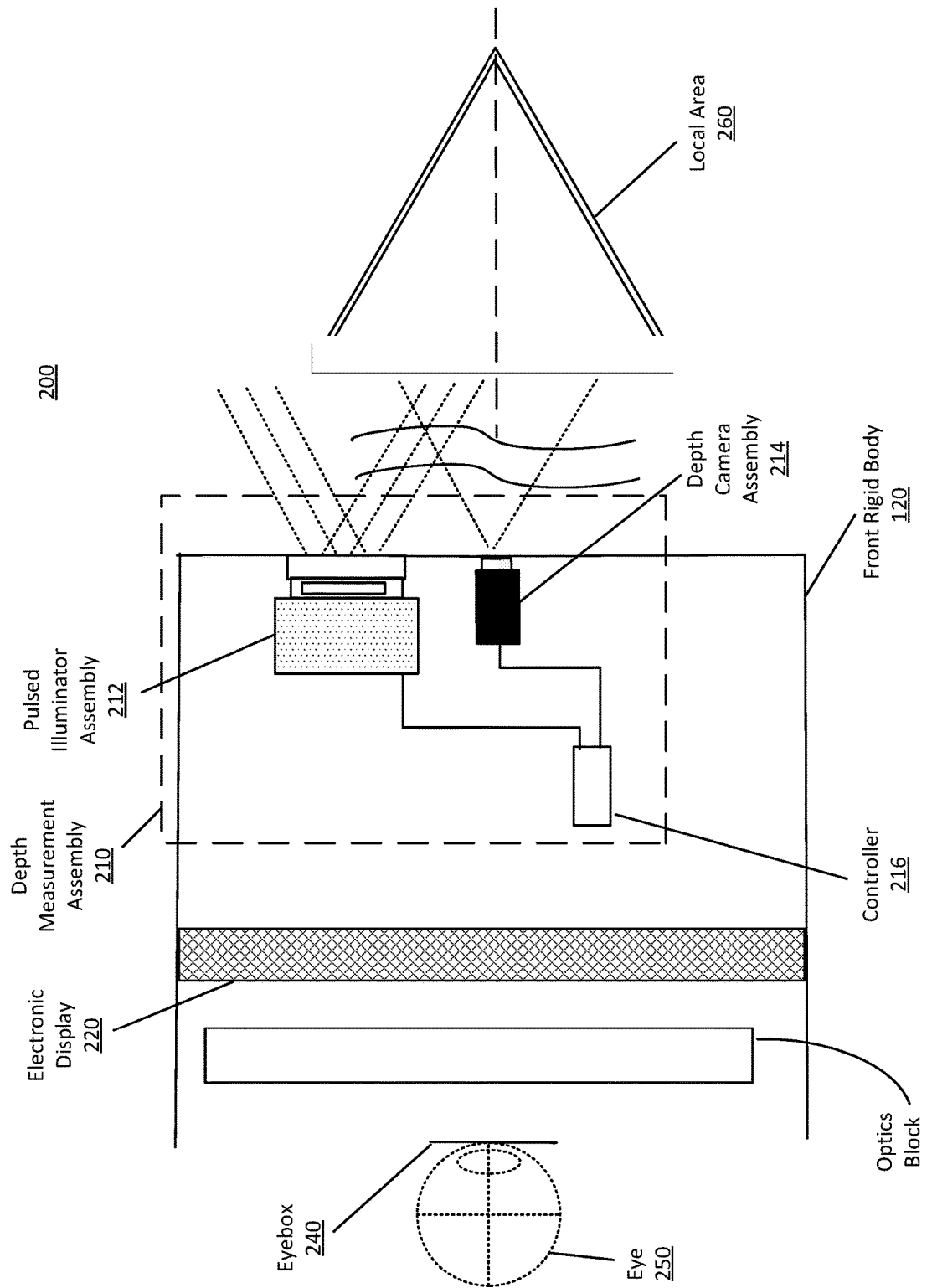
FIG. 2 is a cross section of a front rigid body of the HMD in FIG. 1, in accordance with an embodiment.

FIG. 2 is a cross section 200 of the front rigid body 120 of the HMD 100 in FIG. 1, in accordance with an embodiment. The front rigid body 120 includes a DMA 210, an electronic display 220, and an optics block 230. Some embodiments of the front rigid body 120 have different components than those described here. Similarly, in some cases, functions can be distributed among the components in a different manner than is described here. The front rigid body 120 also includes an eyebox 240 where an eye 250 of a user would be located. For purposes of illustration, FIG. 2 shows a cross section of the front rigid body 120 in accordance with a single eye 250. Although FIG. 2 depicts a center cross-section of the eye 250 as being in the same plane as the DMA 210, the center cross-section of the eye 250 and the DMA 210 do not have to be in the same plane. Additionally, another electronic display and optics block, separate from those shown in FIG. 2, may be included in the front rigid body 120 to present content, such as an augmented representation of a local area 260 or virtual content, to another eye of the user.

The DMA 210 includes a pulsed illuminator assembly 212, a depth camera assembly 214, and a controller 216. The pulsed illuminator assembly 212 illuminates the local area 260 with pulses of structured light. The depth camera assembly 214 captures images of the local area 260 in synchronization with the pulses of structured light and outputs image data to the controller 216.

In some embodiments, the controller 216 is configured to determine depth information for objects in the local area 260 using image data from the depth camera 214. The controller 216 also controls how pulses of structured light is projected by the pulsed illuminator assembly 212 and how the depth camera assembly 214 captures image light. For example, the controller instructs the pulsed illuminator assembly 212 to project the pulse at a pulse rate and instructs the depth camera assembly 214 to capture the image data with an exposure interval that is pulsed and synchronized to the pulse rate. In alternate embodiments, some other device (e.g., a HMD console) determines depth information for the local area 260.

The electronic display 220 displays images (e.g., 2D or 3D images) to the user. In various embodiments, the electronic display 220 comprises a single electronic display panel or multiple electronic display panels (e.g., a display for each eye of a user). Examples of an electronic display panel include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optics block 230 magnifies received light from the electronic display 220, corrects optical errors associated with the image light, and the corrected image light is presented to a user of the HMD 100. The optics block 230 is an optical element, such as an aperture, a Fresnel lens, a convex lens, a concave lens, a filter, or any other suitable optical element that affects the image light emitted from the electronic display 220. Moreover, the optics block 230 may include combinations of different optical elements. In some embodiments, one or more of the optical elements in the optics block 230 may have one or more coatings, such as partial reflectors or anti-reflective coatings.

Magnification of the image light by the optics block 230 allows the electronic display 220 to be physically smaller, weigh less, and consume less power than larger displays. Additionally, magnification may increase a field of view of the displayed media. For example, the field of view of the displayed media is such that the displayed media is presented using almost all (e.g., 110° diagonal), and in some cases all, of the user's instantaneous field of view. In some embodiments, the effective focal length the optics block 230 is larger than the spacing to the electronic display 220. Consequently, the optics block 230 magnifies the image light projected by the electronic display 220. Additionally, in some embodiments, the amount of magnification may be adjusted by adding or removing optical elements.

The optics block 230 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 220 for display is pre-distorted, and the optics block 230 corrects the distortion when it receives image light from the electronic display 220 generated based on the content.

Figure 3:
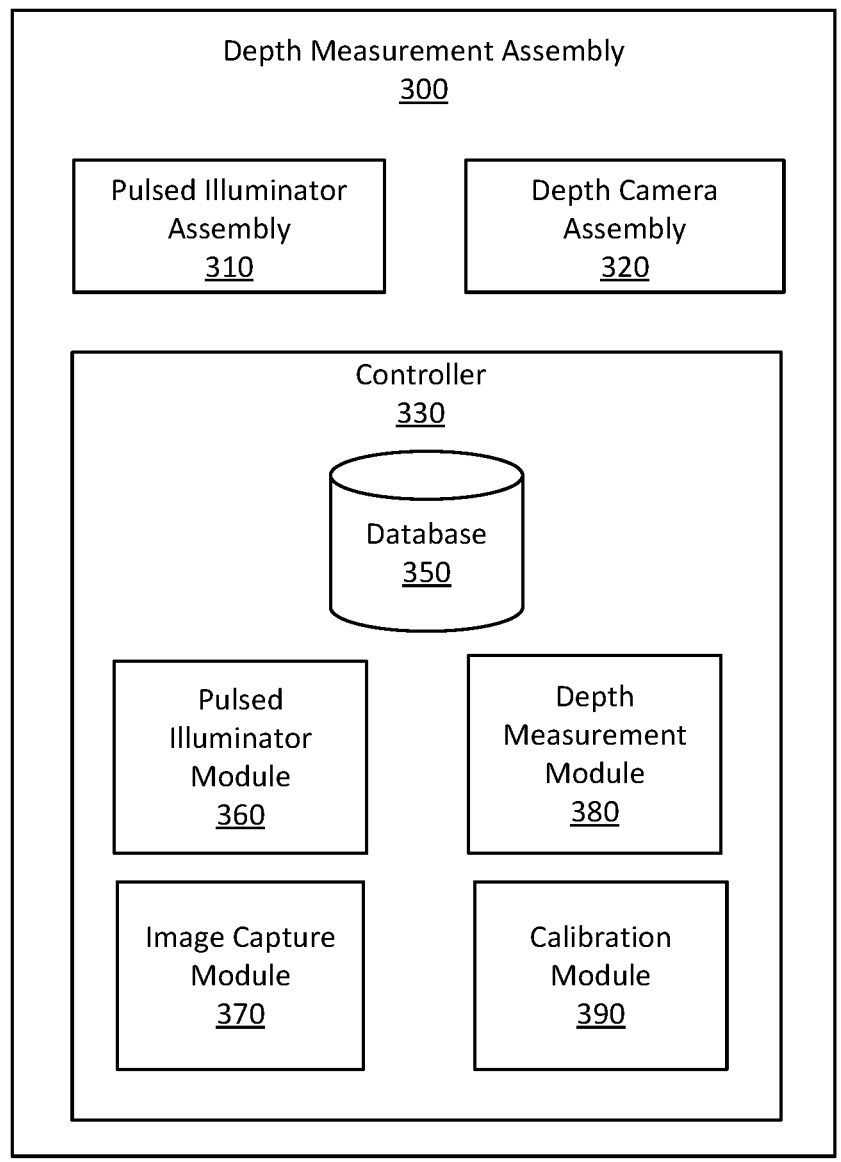
FIG. 3 is a block diagram of a DMA, in accordance with an embodiment.

FIG. 3 is a block diagram of a DMA 300, in accordance with an embodiment. The DMA 300 determines depth information for one or more objects in a local area. The DMA 300 includes a pulsed illuminator assembly 310, a depth camera assembly 320, and a controller 330. Some embodiments of the DMA 300 have different components than those described here. Similarly, the functions can be distributed among the components in a different manner than is described here.

The pulsed illuminator assembly 310 projects pulses of structured light into a local area. The pulsed illuminator assembly 310 includes one or more structured light projectors that are each configured to project pulses of structured light. A structured light projector includes a pulsed illuminator, a diffractive optical element (DOE), and a projection assembly. The pulsed illuminator emits pulses of light. The pulsed illuminator may emit pulses of various frequencies or durations. For example, the illuminator instructions cause the pulsed illuminator to emit pulses with a frequency in a range from ~100 kHz to 200 MHz or from ~500 kHz to 2 MHz. In some embodiments, the pulses have a constant pulse duration, e.g., 100 ns. In alternative embodiments, the pulses may have different pulse durations in a range from 100 ps to 100 ns or from ~1 ns to 10 ns. Heat generated in the vicinity of the pulsed illuminator can dissipate between pulses. The pulsed illuminator can emit light in the visible band (i.e., ~380 nm to 750 nm), in the infrared (IR) band (i.e., ~750 nm to 1 mm), in the ultraviolet band (i.e., 10 nm to 380 nm), in the shortwave infrared (SWIR) band (e.g., ~900 nm to 2200 nm or ~1300 nm to 1500 nm), some other portion of the electromagnetic spectrum, or some combination thereof.

The DOE converts light from the pulsed illuminator into structured light. Structured light is light that may be used to determine depth information. Structured light may include, e.g., a dot matrix pattern, a single line pattern, a sinusoid pattern, a multi (spatial) tone pattern, and a grid pattern, diffuse light (e.g., for time of flight depth determination), some other light that can be used to determine depth information, or some combination thereof. A DOE may be, e.g., one or more diffraction gratings, a diffuser, a spatial light modulator, some other element that forms structured light, or some combination thereof. In some embodiments, structured light is not generated by a DOE but is formed by interference of two or more beams of pulses of light, such as time-shared scanning beams or Gaussian beams. The projection assembly projects the structured light into the local area. The projection assembly includes one or more optical elements (e.g., lens, polarizer, etc.) that collect the structured light and project the structured light into some or all of the local area.

In embodiments where the pulsed illuminator assembly 310 includes multiple (i.e., at least two) structured light projectors, the structured light projectors may emit pulses of structured light at different times. In one embodiment, the structured light projectors are alternating. For example, a first structured light projector projects a first pulse of structured light, and while the structured light projector is inactive (e.g., cooling down), a second structured light projector projects a second pulse, optionally followed by a third or more structured light projectors. This cycle repeats. Within each cycle, there may be a time gap between pulses projected by different structured light projectors. In one embodiment, the structured light projectors project pulses of structured light having a same structured light pattern. In an alternative embodiment, each structured light projector is associated with a different structured light pattern. Likewise, pulses emitted from the structured light projectors may have different frequencies, durations, wavelengths, or any combination thereof.

The combination of multiple structured light projector generates more signals within a duty cycle without causing any of the structured light projectors overheated. Accordingly, depth measurement can be more efficiently by multiplexing multiple measures between pulses. Also, with geometrical structured light projectors, shadows caused by a single structured light projector can be removed. Additionally, multiplexed structured light projectors can make a structured light pattern denser, compared with the structured light pattern projected by a single structured light projector.

The depth camera assembly 320 captures image data of a portion of the local area illuminated with the pulses of structured light. In some embodiments, the depth camera assembly 320 is co-located with the pulsed illuminator assembly 310 (e.g., may be part of the same device). In some embodiments, the depth camera assembly 320 includes a detector that detects structured light pattern in a field of view of the depth camera assembly 320. The detector comprises an arrays of photodiodes. A photodiode is sensitive to light and converts collected photons to photoelectrons. Each of the photodiodes has one or more storage regions that store the photoelectrons. The depth camera assembly 320 reads out the stored photoelectrons from the one or more storage regions of each photodiode to obtain image data. During the readout, the depth camera assembly 320 can convert the photoelectrons into digital signals (i.e., analog-to-digital conversion). In embodiments where the pulsed illuminator assembly 310 includes more than one structured light projector, photoelectrons corresponding to pulses of structured light projected by different structured light projectors can be stored in separate storage regions of each photodiode of the detector. The depth camera assembly 320 may read out the separate storage regions to obtain separate image data corresponding to each structured light projector. Alternatively, the depth camera assembly 320 can generate combined image data corresponds to all the structured light projectors.

The detector is synchronized with pulse emission of the structured light projector 310. For example, the detector has an exposure interval that is pulsed and synchronized to the pulse rate of the pulsed illuminator assembly 310. During the exposure interval, the detectors takes exposures of the portion of the local area. Outside the exposure interval, the detector does not take exposures. In some embodiments, for each pulse of structured light projected by the pulsed illuminator assembly 310, the detector takes one or more exposures (e.g., a single exposure or multiple interlaced exposures) for a time period ("exposure duration") that is same as or longer than the pulse duration of pulses of structured light emitted from the pulsed illuminator assembly 310. In some embodiments, the exposure duration is a single integration period during which a single pulse is collected and sorted into a single storage region, e.g., a time period from the first photon of the pulse is emitted till the last photon of the pulse is collected by the detector.

In embodiments where the pulsed illuminator assembly 310 includes a single structured light projector emitting a series of pulses of structured light, the exposure duration for a pulse of structured light begins before or at the same time with the structured light projector emits the pulse of structured light. The detector collects photoelectrons during the exposure duration and stores the photoelectrons into a storage region. The detector repeats this process until photons of the last pulse emitted by the structured light projector are collected. The detector can read out, from the storage region, photoelectrons accumulated over the series of pulses. The read out can be done after photons of the last pulse are collected. The detector may collect photoelectrons from background light outside exposure durations. The photoelectrons from the background light are stored in a second storage region, such as a temporary storage region or a silicon substrate. The second storage region is not read out and can be reset.

In embodiments where the pulsed illuminator assembly 310 includes multiple structured light projectors, the detector collects photoelectrons during an exposure duration for each pulse of structured light emitted by the structured light projectors. The detector can store the photoelectrons from pulses emitted by each structured light projector into a different storage region. The detector may read out the different storage regions sequentially, e.g., after photons of the last pulse emitted by the structured light projectors are collected. In instances where the detector may collect photoelectrons from background light outside exposure durations, the photoelectrons from the background light are stored in a temporary storage region or a silicon substrate that is not read out and can be reset. Because the detector does not continuously collect light, accumulation of photons from ambient light is avoided. Consequently, a higher signal-to-noise ratio may be achieved relative to, e.g., systems that continuously collect light.

In one embodiment, the detector uses global shutter scanning. The detector includes a global shutter that is synchronized with the pulsed illuminator assembly 310. For example, the global shutter opens and scans during each pulse of structured light and closes when the pulse ends. Thus, the global shutter blocks accumulation of photos from ambient light. In one embodiment, the detector is a Time of Flight (ToF) sensor.

In some embodiments, each photodiode of the detector has at least two storage regions, and can have many more (e.g., 3, 4, etc.). A photodiode captures light reflected from the object in the local area, including the pulses of structured light emitted by the pulsed illuminator assembly 310 and ambient light. For example, for a given photodiode that includes a first storage region and a second storage region, photoelectrons corresponding to light captured during exposure durations of the detector ("pulsed signals") are stored in the first storage region, and other photoelectrons ("ambient signals") are stored in the second storage region. Duty cycle between the two storage regions matches duty cycle of the pulsed illuminator assembly 310. The depth camera assembly 320 reads out the first storage regions of the photodiodes of the detector to obtain image data. In some embodiments, the depth camera assembly 320 does not read out the second storage regions of the photodiodes. And the second storage region can be reset after each duty cycle. In some alternative embodiments, the depth camera assembly 320 reads out the second storage regions. And image data read out the second storage regions, which correspond to reflected ambient light, can be used to subtract ambient background from the pulsed signals before or after the first storage regions are read out.

The number of storage regions associated with each photodiode may vary. For example, some photodiodes may have two storage regions, some may have three, and some may have four. In embodiments where the pulsed illuminator assembly 310 includes more than one structured light projector, each storage region associated with a photodiode can be configured to store photoelectrons generated from a different structured light projector.

In some other embodiments, the detector includes a tunable filter. The tunable filter blocks light from arriving at the detector. The tunable filter may be mounted anywhere in the optical path of the pulses of structured light reflected from the object in the local area. For example, the tunable filter is attached on top of the detector or at the front of the depth camera assembly 320. The tunable filter can be switched between on (active) and off (inactive) in synchronization with the structured light projector 310. For example, for each pulse of structured light, the tunable filter is inactive for the exposure duration of the detector. When the tunable filter is inactive, light can pass the tunable filter and reach the detector. The tunable filter is active outside exposure durations of the detector. When the tunable filter is active, light is blocked from the detector.

The controller 330 controls the pulsed illuminator assembly 310 and the depth camera assembly 320. The controller 330 also determines depth information using image data generated by the depth camera assembly 320. The controller 330 can also generate tracking information based on the depth information. Tracking information is information indicating positions, orientations and/or movement of objects and/or HMD orientation. Tracking information includes, e.g., depth information of a local area, movement information of an object, position and orientation of one or both eyes of a user, gaze direction (e.g., where a user is looking), vergence, estimated accommodation plane, etc.

In the example shown by FIG. 1, the controller 330 includes a database 350, a pulsed illuminator module 360, an image capture module 370, a depth measurement module 380, and a calibration module 390. These modules are software modules implemented on one or more processors, dedicated hardware units, or some combination thereof. Some embodiments of the controller 330 have different components than those described in conjunction with FIG. 1. Similarly, functions of the components described in conjunction with FIG. 1 may be distributed among other components in a different manner than described in conjunction with FIG. 1. For example, some or all of the functionality described as performed by the controller 330 may be performed by a HMD console.

The database 350 stores data generated and/or used by the DMA 300. The database 350 is a memory, such as a ROM, DRAM, SRAM, or some combination thereof. The database 350 may be part of a larger digital memory of a HMD system. In some embodiments, the database 350 stores image data from the depth camera assembly 320, baseline data from the calibration module 390 describing trained or established baseline prior to depth measurement, depth information, and analysis data from the depth measurement module 380 describing characterization parameters. In some embodiments, the database 350 may store calibration data and/or other data from other components, such as depth instructions. Depth instructions include illuminator instructions generated by the pulsed illuminator module 360 and camera instructions generated by the image capture module 370.

The database 350 also stores a model for an object of which the depth camera assembly 320 captures images. The model is used to compare to the image captured by the depth camera to determine depth and tracking information of the object. The model stored in the database 350 can be a 3D model which approximates the surface geometry of the object. In embodiments in which the depth camera assembly 320 captures image data of more than one object, the database 350 may contain more than one model.

The pulsed illuminator module 360 controls the pulsed illuminator assembly 310 via illuminator instructions. The illuminator instructions includes one or more pulse parameters that control how light is emitted by the pulsed illuminator assembly 310. A pule parameter may describe, e.g., pulse rate, pulse length, pulse wavelength, pulse amplitude, some other parameter that controls how the pulses of structured light are projected by the pulsed illuminator assembly 310, or some combination thereof. The pulsed illuminator module 360 may retrieve the illuminator instructions from the database 350. Alternatively, the pulsed illuminator module 360 generates the illuminator instructions. For example, the pulsed illuminator module 360 determines the one or more pulse parameters. In one embodiment, the pulsed illuminator module 360 determines the one or more pulse parameters based on a safety standard of an object in the local area and/or thermal constraints of the pulsed illuminator assembly 310. In embodiments where the pulsed illuminator assembly 310 include multiple structured light projectors, the pulsed illuminator module 360 determines the one or more pulse parameters to avoid overlapping capture of pulses of structured light projected by different structured light projectors. The pulsed illuminator module 360 also determines one or more structured light patterns projected by the pulsed illuminator assembly 310. In some embodiments, the pulsed illuminator module 360 selects the one or more structured light patterns based on the previously reported depth information of an object as reported by the DMA 300. Structured light patterns determined by the pulsed illuminator module 360 may include, e.g., dot, single line, sinusoid, grid, multi-tone pattern, other types of patterns, diffuse light (e.g., for time of flight operation), etc.

The image capture module 370 controls the depth camera assembly 320 via camera instructions. The image capture module 370 may retrieve camera instructions from the database 350. Alternatively, the image capture module 370 generates camera instructions based in part on the illuminator instructions generated by the pulsed illuminator module 360. The image capture module 370 determines exposure rate and exposure duration of the depth camera assembly 320, e.g., based on one or more pulse parameters (e.g., pulse rate and pulse duration) specified in the illuminator instructions. For example, the image capture module 370 determines that the exposure rate equals the pulse rate so that an exposure interval of the depth camera assembly 320 is synchronized with the pulse rate. Also, the image capture module 370 determines that the exposure duration equals the pulse duration. Sometimes the image capture module 370 determines that the exposure duration is longer than the pulse duration to avoid failure to collector a whole pulse due to delay in incoming light. The exposure duration can be 20% longer than the pulse duration. In some embodiments, the also image capture module 370 determines a number of exposures for each pulse of structured light.

The camera instruction may also identify storage regions of the depth camera assembly 320 to read out. For example, in embodiments where each photodiode of the depth camera assembly 320 has a first storage region and a second storage region, the camera instruction cause the depth camera assembly 320 to read out the first storage regions of the photodiodes and not to read out the second storage regions. Also, in embodiments where the pulsed illuminator assembly 310 has multiple structured light projectors and the depth camera assembly 320 includes different storage regions for the structured light projectors, the camera instructions may cause the depth camera assembly 320 to read out the storage regions separately for generating separate images. Alternatively, the camera instructions may cause the depth camera assembly 320 to read out the storage regions all together for generating combine image data.

The depth measurement module 380 is configured to determine depth information for the one or more objects based at least in part on the captured portions of the reflected structured light. In some embodiments, for depth sensing based on structured light illumination, the depth measurement module 380 is configured to determine depth information based on phase-shifted patterns of the portions of the reflected structured light distorted by shapes of the objects in the local area, and to use triangulation calculation to obtain a depth map of the local area. In alternate embodiments, for depth sensing based on time-of-flight, the depth measurement module 380 is configured to determine depth information using a ratio of charge between the storage regions associated with each photodiode of the depth camera assembly 320. In some embodiments, the depth measurement module 380 provides the determined depth information to an HMD system. The HMD system may utilize the depth information to, e.g., generate content for presentation on an electronic display 220.

Figure 4:
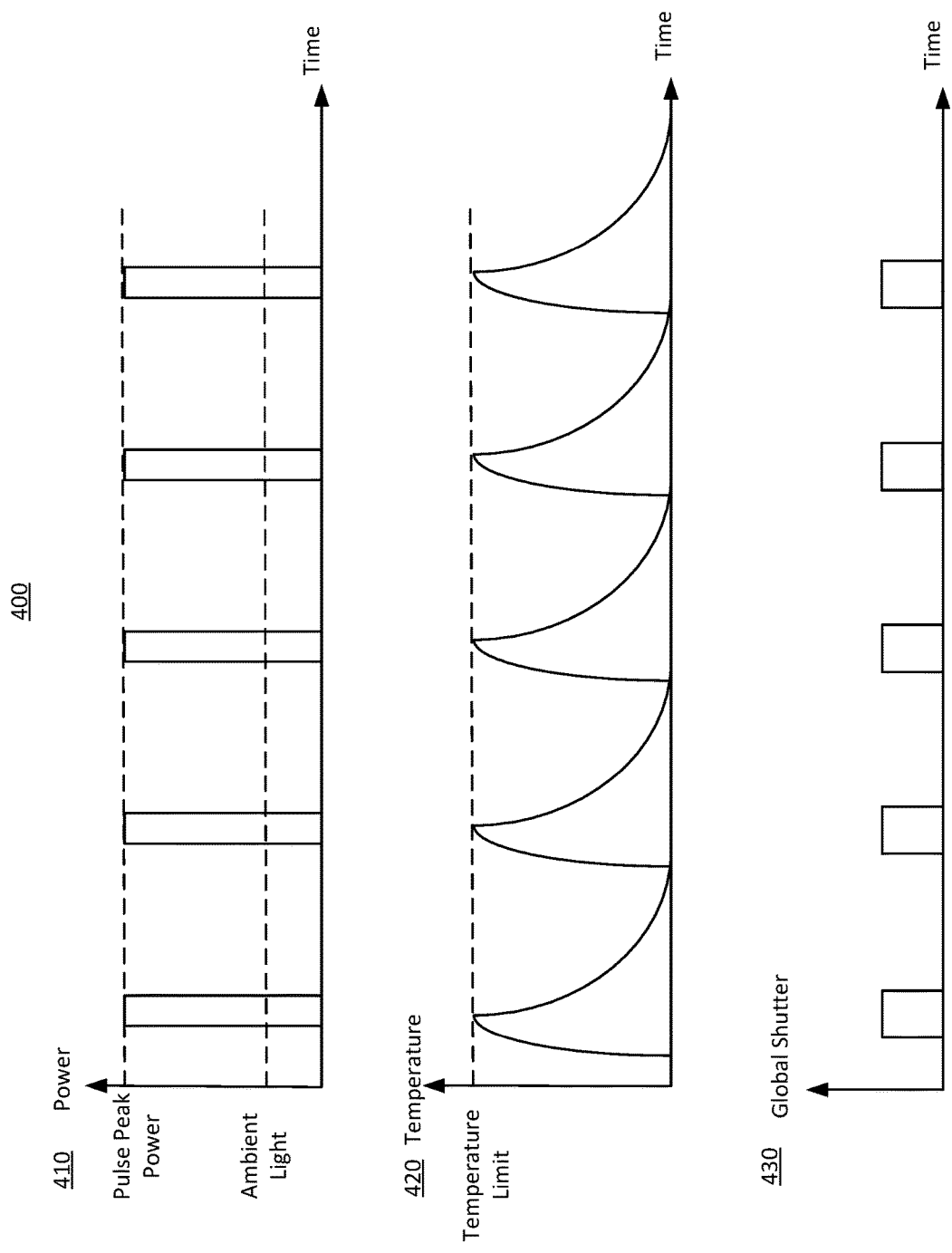
FIG. 4 illustrates a pulsing depth measurement scheme including a single structured light projector, in accordance with an embodiment.

FIG. 4 illustrates a pulsing depth measurement scheme 400 including a single structured light projector, in accordance with an embodiment. FIG. 4 includes three plots 410, 420, and 430.

The plot 410 shows peak power of pulses projected by the structured light projector as a function of time. For the purpose of illustration and simplicity, the plot 410 shows five pulses of structured light emitted by the structured light projector. But the structured light projector may emit a large number of pulses, such as hundreds or thousands, to achieve adequate signal-to-noise ratio. As shown in the plot 410, the five pulses have a high peak power, which is significantly higher than power of ambient light. Consequently, the five pulses can overwhelm the ambient light, resulting in high signal-to-noise ratio. In the plot 410, the five pulses have a same pulse duration. For example, each pulse may have a pulse duration of 100 ns, and a time duration (e.g., 100 ms) between two adjacent pulses can be significantly longer than the pulse duration. In other embodiments, the pulses may have different pulse durations or peak powers. Likewise, time duration between two adjacent pulses can be different.

The plot 420 shows temperature in a vicinity of the structured light projector as a function of time. The temperature in a vicinity of the structured light projector reaches a temperature limit of the depth measurement scheme 400 while the structured light projector emits each of the five pulses. However, temperature in the vicinity of the structured light projector stays at the temperature limit for a very short period of time (i.e., less than the duration of a pulse). That avoids accumulation of too much heat in the vicinity of the structured light projector. During time durations between the pulses, the structured light projector is inactive, allowing heat generated during emission of the pulses to dissipate. Thus, the pulsing depth measurement scheme 400 reaches the temperature limit to generate high-peak-power pulses of structured light; and at the same time, because it stays at the temperature limit for a very short period of time and the structured light projector is inactive during the pulses, overheating of the system is avoided. Also, for objects in a local area illuminated by the structured light projector that are vulnerable to heat (e.g., a human eye), the pulsed depth measurement scheme can meet safety standards of those objects.

The plot 430 shows global shutter scanning of a depth camera assembly of the pulsing depth measurement scheme 400 as a function of time. The depth camera assembly captures image data of a portion of a local area illuminated by the five pulses. As illustrated in the plot 430, an exposure interval of a global shutter of the depth camera assembly is pulsed and synchronized with pulses emitted by the structure light projector. Accordingly, collection of ambient light is limited to achieve high signal-to-noise ratio. For each pulse, the depth camera assembly collects light over an exposure duration that is longer than duration of the pulse so that the depth camera assembly captures the full pulse despite possible delay in incoming light due to distance between the structured light projector, the object, and the depth camera assembly. In one implementation, the exposure duration is 20% longer than the pulse duration. Alternatively, the exposure duration can be the same as the pulse duration.

Figure 5:
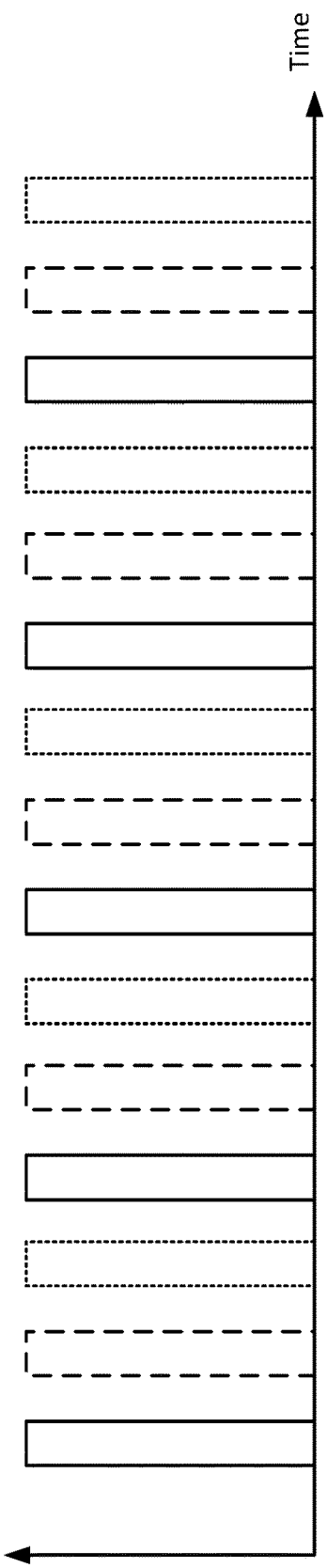
FIG. 5 illustrates a pulsing depth measurement scheme including three alternating structured light projectors, in accordance with an embodiment.
Figure 5:

FIG. 5 illustrates a pulsing depth measurement scheme 500 including three alternating structured light projectors, in accordance with an embodiment. FIG. 5 includes two plots 510 and 520 illustrating pulsing illumination by the three structured light projectors and image capture by a depth camera assembly 320 that captures images of an object illuminated by the three structured light projectors. In alternative embodiments, the pulsing depth measurement scheme 500 may have a different number of structured light projectors.

The plot 510 shows peak power of pulses projected by the structured light projectors as a function of time. The solid lines represent pulses of the first structured light projector; the dash lines represent pulses of the second structured light projector; and the dot lines represent pulses of the third structured light projector. The three structured light projectors are alternating. After the first structured light projector emits a pulse of structured light, the second structured light projector emits a pulse of structured light, followed by a pulse of structured light emitted by the third structured light projector. This process repeats. For purpose of illustration and simplicity, each of the three structured light projectors emits five pulses. But the structured light projectors can emit different numbers of pulses. In one embodiment, the three structured light projectors projects different structured light pattern. In an alternative embodiment, the three structured light projectors project the same structured light pattern.

The plot 520 shows global shutter scanning of a depth camera assembly of the pulsing depth measurement scheme 500 as a function of time. The depth camera assembly collects light reflected by a portion of a local area illuminated by the three structured light projectors in synchronization with pulsing of structured light projectors and generates image data based on the collected light. The global shutter scanning of the depth camera assembly synchronizes with the pulses projected by the structured light projectors. Similar to the plot 430, the plot 520 shows that for each pulse, the global shutter scans for an exposure duration longer than the pulse duration. In one embodiment, the depth camera assembly 320 stores photoelectrons converted from photons corresponding to pulses of each structured light projector into a different storage region of each photodiode. The depth camera assembly 320 further read out the storage regions to generate image data. Because photoelectrons corresponding to pulses projected by each structured light projector are stored in a different storage region of each photodiode, the depth camera assembly 320 generates separate image data corresponding to each of the three structured light projectors. Alternatively, the depth camera assembly 320 combines photoelectrons corresponding to pulses emitted by the three structured light projectors to generate combined image data. The combined image data is an integration of image data from each of the three structured light projectors.

The combined image data include information regarding structured light patterns corresponding to the three structured light projectors. Accordingly, the combined image data provides three times more information in a single duty cycle, compared with an image corresponding to a single structured light projector. Thus, the pulsing depth measurement scheme 500 may be more efficient for depth measurement, compared with the pulsing depth measurement scheme 400. In some embodiments, the three structured light projectors illuminate three objects, respectively. Accordingly, the combined image data includes information indicating distortions in the structured light patterns caused by surfaces of the three objects. Thus, the combined image data can be used to generate depth information for all the three objects. Alternatively, the three structured light projectors can illuminate three different parts of a same object and the combined image can be used to generate depth information for all the three parts of the object. This will be particularly useful for an object having uneven surfaces.

Figure 6A:
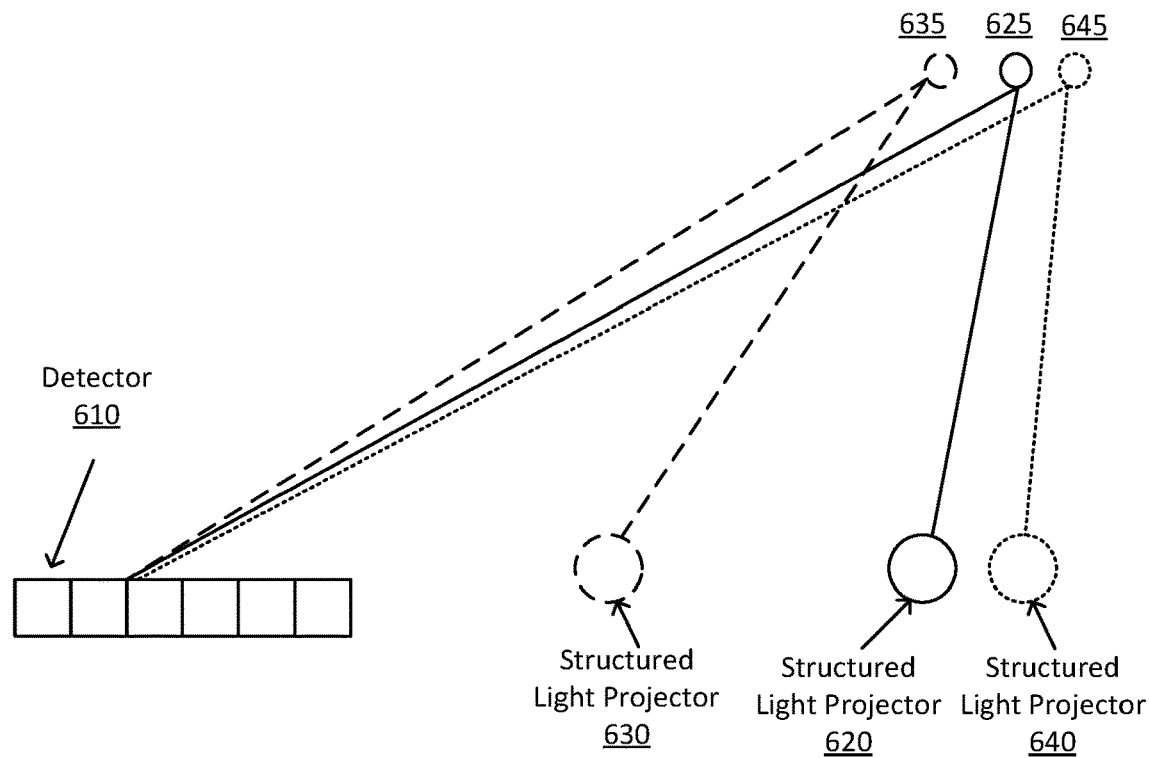
FIG. 6A illustrates a detector of a depth camera assembly capturing pulses of structured light reflected from an object illuminated by three structured light projectors, in accordance with an embodiment.

FIG. 6A illustrates a detector 610 of a depth camera assembly capturing structured light reflected from objects 625, 635, and 645 illuminated by three structured light projectors 620, 630, and 640, in accordance with an embodiment. The structured light projector 620 is represented by solid line, versus dash line for the structured light projector 630 and dot line for the structured light projector 640. In one embodiment, the detector 610 is the detector described in conjunction with FIG. 3. And the three structured light projectors 620, 630, and 640 can be the three alternating structured light projectors described in conjunction with FIG. 5. In embodiments where three structured light projectors 620, 630, and 640 illuminate one object, two structured light projectors can be closer to each other and the third structured light projector is further from them. Such a setup of the structured light projectors 620, 630, and 640 is configured to remove shadows by illuminating the object from different angles.

In the embodiment of FIG. 6A, the three structured light projectors 620, 630, and 640 illuminate three different objects 625, 635, and 645 with different structured light patterns. Pulses of structured light reflected from the three objects 625, 635, and 645 arrive at the detector 610. The detector 610 captures the reflected light and converts photons of the reflected light into photoelectrons. As shown in FIG. 6, pulses of structured light reflected from the three objects 625, 635, and 645 arrive at the detector 610 at the same location. Each photodiode of the detector 610 has a different storage region for photoelectrons corresponds to each object/structured light projector. Accordingly, even though arriving locations of the reflected light overlap on the detector 610, the depth camera assembly 320 can generate separate image data corresponding to light reflected from each of the three objects 625, 635, and 645. Alternatively, the depth camera assembly 320 can generate combined image data that includes information regarding three patterns corresponding to all the three objects 625, 635, and 645.

Figure 6B:
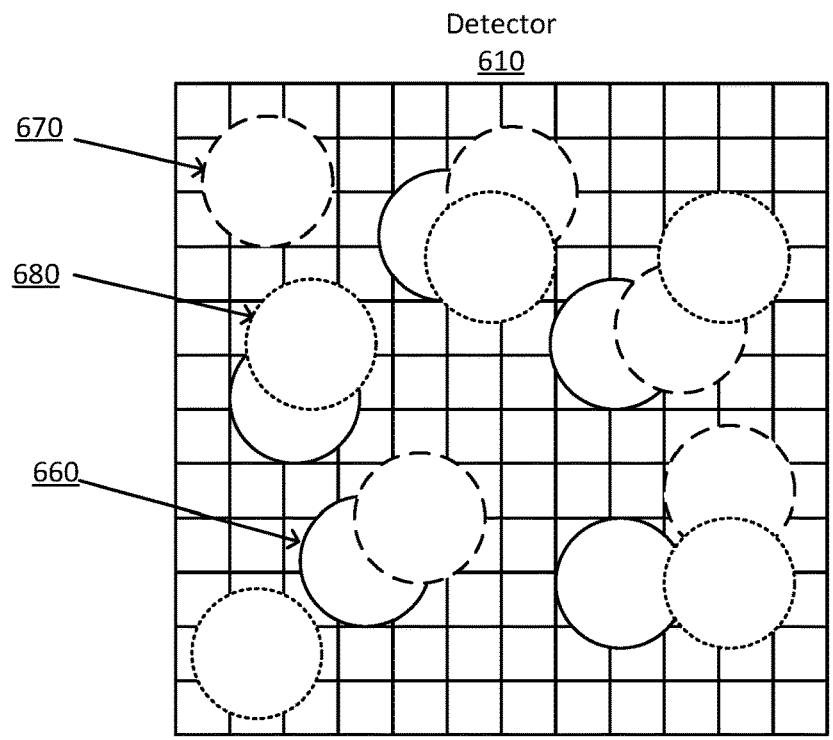
FIG. 6B shows an array of photodiodes of the detector in FIG. 6A, in accordance with an embodiment.

FIG. 6B shows an array of photodiodes of the detector 610 in FIG. 6A, in accordance with an embodiment. Each grid in FIG. 6B represents a photodiode of the detector 610. FIG. 6B shows a 12×12 array of photodiodes. But the detector 610 may have a different number of photodiodes. Each photodiode of the detector 610 has one or more storage regions. The photodiodes collect three structured light patterns 660, 670, and 680. The structured light pattern 660 is represented by solid line, the structured light pattern 670 is represented by dash line, and the structured light pattern 680 is represented by dot line. The structured light pattern 660 corresponds to light reflected from the object 625 illuminated by the structured light projector 620. Likewise, structured light pattern 670 corresponds to light reflected from the object 635 illuminated by the structured light projector 630 and the structured light pattern 680 corresponds to light reflected from the object 645 illuminated by the structured light projector 640. The structured light patterns 660, 670, and 680 overlap on some of the photodiodes.

In one embodiment, each of the three photodiodes has three storage regions and stores photoelectrons corresponding to three the structured light patterns 660, 670, and 680 into the three storage regions separately. Thus, separate image data can be generated for each structured light pattern by reading out photoelectrons for the structured light pattern. Also, combined image data can be generated by reading out photoelectrons from all the three storage regions of each photodiode. Depth information of the three objects 525, 535, and 545 can be determined by using the separate image data and/or the combined image data.

Figure 7:
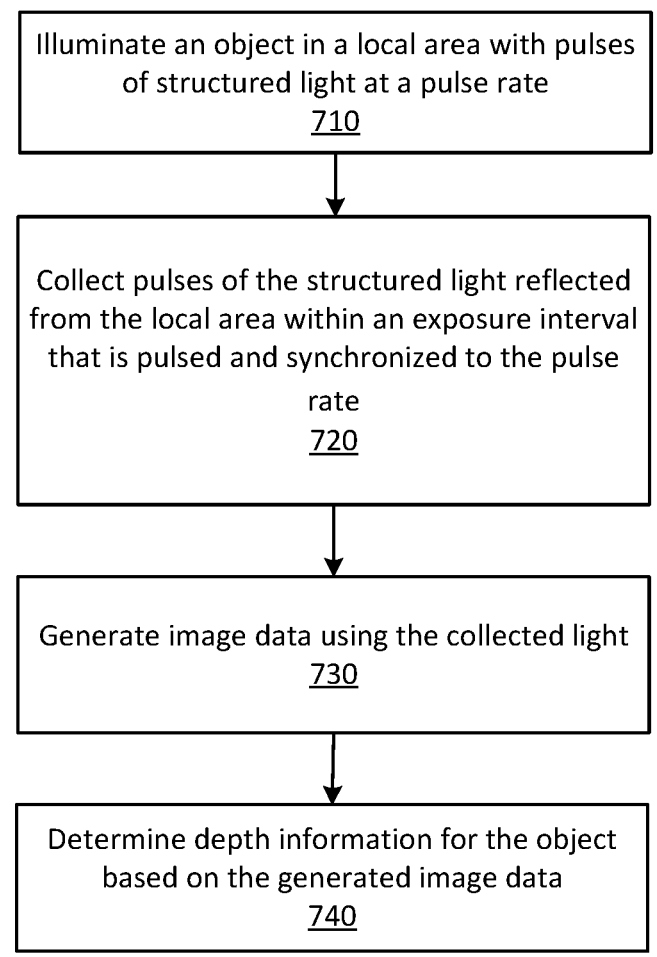
FIG. 7 is a flowchart of one embodiment of a process for pulsing depth measurement, in accordance with an embodiment.

FIG. 7 is a flowchart of one embodiment of a process 700 for pulsing depth measurement, in accordance with an embodiment. The process 700 is performed by a DMA 300 described in conjunction with FIG. 3. Alternatively, other components may perform some or all of the steps of the process 700. For example, in some embodiments, a HMD and/or a console may perform some of the steps of the process 700. Additionally, the process 700 may include different or additional steps than those described in conjunction with FIG. 7 in some embodiments or perform steps in different orders than the order described in conjunction with FIG. 7.

The DMA 300 illuminates 710 an object in a local area with pulses of structured light at pulse rate. A pulsed illuminator assembly 310 of the DMA 300 projects the pulses of structured light. For example, the pulsed illuminator assembly 310 projects pulses of a dot pattern on an object in a local area. As another example, the pulsed illuminator assembly 310 projects pulses of a dot pattern on an eye of a user. In some embodiments, the pulsed illuminator assembly 310 includes at least two structured light projectors. The structured light projectors project pulses of structured light at different times.

The DMA 300 collects 720 pulses of structured light reflected from the local area within an exposure interval that is pulsed and synchronized to the pulse rate. For example, the DMA 300 includes a depth camera whose global shutter opens and scans during each pulse of structured light but closes between the pulses. For each pulse of the structured light, the global shutter can scan for an exposure duration that is same as or longer than duration of the pulse.

The DMA 300 generates 730 image data using the collected pulses of structured light. For example, the DMA 300 includes a depth camera including a plurality of photodiodes that collect pulses of structured light and convert the collected pulses of structured light into photoelectrons. The depth camera can generate the image data from the photoelectrons. In embodiments where the DMA 300 includes more than one structured light projector, the DMA 300 can generate separate image data for each structured light projector and/or combined image data for all the structured light projectors.

The DMA 300 determines 740 depth information for the object based on the generated image data. In some embodiments, for depth sensing based on structured light illumination, the DMA 300 captures a portion of the reflected pulses of structured light distorted by shapes of the objects in the local area, and uses triangulation calculation to obtain a depth map of the local area.

In alternate embodiments, e.g., for depth sensing based on time-of-flight, the DMA 300 determines the depth information using a ratio of charges stored in storage regions associated with each photodiode of a depth camera. In this case, the depth camera can be configured to store photoelectrons in each storage regions associated with an intensity of received light for a particular amount of time. In embodiments where the DMA 300 includes more than one structured light projector, the depth camera can be configured to store photoelectrons corresponding to each structured light projector in a different storage region associated with each photodiode.

Figure 8:
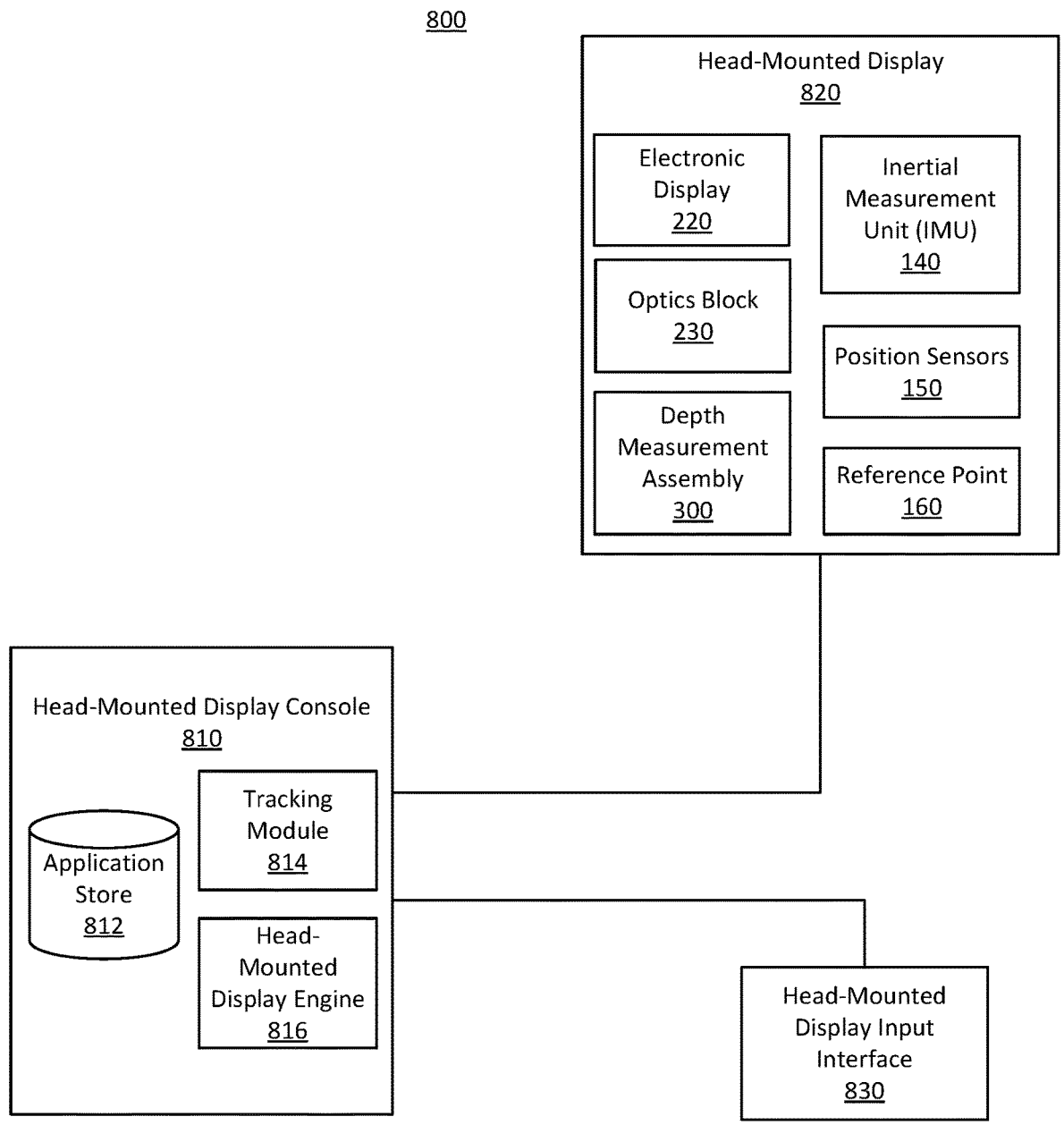
FIG. 8 is a block diagram of a HMD system in which the DMA operates, in accordance with an embodiment.

FIG. 8 is a block diagram of a HMD system 800 in which the DMA 300 operates, in accordance with an embodiment. The HMD system 800 may operate in a VR system environment, an AR system environment, an MR system environment, or some combination thereof. The HMD system 800 shown by FIG. 8 comprises a HMD console 810 coupled to a HMD 820 and a HMD input interface 830. While FIG. 8 shows an example system 800 including one HMD 820 and one HMD input interface 830, in other embodiments any number of these components may be included in the system 800. For example, there may be multiple HMDs 820, each having an associated HMD input interface 830 and communicating with the HMD console 810. In alternative configurations, different and/or additional components may be included in the system environment 800. Similarly, functionality of one or more of the components can be distributed among the components in a different manner than is described here. For example, some or all of the functionality of the HMD console 810 may be contained within the HMD 820.

The HMD 820 is a head-mounted display that presents content to a user comprising virtual and/or augmented views of a physical, real-world environment with computer-generated elements (e.g., 2D or 3D images, 2D or 3D video, sound, etc.). Examples of media presented by the HMD 820 include one or more images, video, audio, or some combination thereof. In some embodiments, audio is presented via an external device (e.g., speakers and/or headphones) that receives audio information from the HMD 820, the console 810, or both, and presents audio data based on the audio information.

The HMD 100 in FIG. 1 is an embodiment of the HMD 820. The HMD 820 includes an electronic display 220, an optics block 230, an IMU 140, one or more position sensors 150, a reference point 160, and the DMA 300. Some embodiments of the HMD 820 have different components than those described here.

In some embodiments, the IMU 140 receives one or more calibration parameters, e.g., from the HMD console 810. The one or more calibration parameters are used to maintain tracking of the HMD 820. Based on a received calibration parameter, the IMU 140 may adjust one or more IMU parameters (e.g., sample rate). In some embodiments, certain calibration parameters cause the IMU 140 to update an initial position of the reference point 160 so it corresponds to a next calibrated position of the reference point 160. Updating the initial position of the reference point 160 as the next calibrated position of the reference point 160 helps reduce accumulated error associated with the determined estimated position. The accumulated error, also referred to as drift error, causes the estimated position of the reference point 160 to "drift" away from the actual position of the reference point 160 over time.

The DMA 300 determines depth information of objects in a local area surrounding the HMD 820. For example, the DMA 300 includes a pulsed illuminator assembly 310 that illuminates the objects with pulses of structured light, a depth camera assembly 310 that captures image data of the illuminated objects in synchronization with the pulsed illuminator assembly 310, and a controller 330 that determines depth information of the objects based on the captured image data. The controller 330 can also control the pulsed illuminator assembly 310 and depth camera assembly 310. In some other embodiments, the functions of the DMA 300 described FIG. 1 may be distributed among other components in the HMD system environment 800 in different manners in other embodiments. For example, some or all of the functionality provided by the controller 330 may be performed by the HMD console 810. Alternatively, some of the control and processing modules of the DMA 300 are part of the HMD 820, and others are part of the HMD console 810.

The HMD input interface 830 is a device that allows a user to send action requests to the HMD console 810. An action request is a request to perform a particular action. For example, an action request may be to start or end an application or to perform a particular action within the application. The HMD input interface 830 may include one or more input devices. Example input devices include: a keyboard, a mouse, a game controller, or any other suitable device for receiving action requests and communicating the received action requests to the HMD console 810. An action request received by the HMD input interface 830 is communicated to the HMD console 810, which performs an action corresponding to the action request. In some embodiments, the HMD input interface 830 may provide haptic feedback to the user in accordance with instructions received from the HMD console 810. For example, haptic feedback is provided when an action request is received, or the HMD console 810 communicates instructions to the HMD input interface 830 causing the HMD input interface 830 to generate haptic feedback when the HMD console 810 performs an action.

The HMD console 810 provides media to the HMD 820 for presentation to the user in accordance with information received from the HMD 820 and/or the HMD input interface 830. In the example shown in FIG. 5, the HMD console 810 includes an application store 812, a tracking module 814, and a HMD engine 816. Some embodiments of the HMD console 810 have different modules than those described in conjunction with FIG. 7. Similarly, the functions further described below may be distributed among components of the HMD console 810 in a different manner than is described here.

The application store 812 stores one or more applications for execution by the HMD console 810. An application is a group of instructions, that when executed by a processor, generates content for presentation to the user. Content generated by an application may be in response to inputs received from the user via movement of the HMD 820 or the HMD input interface 830. Examples of applications include: gaming applications, conferencing applications, video playback application, or other suitable applications.

The tracking module 814 calibrates the HMD system 800 using one or more calibration parameters and may adjust one or more calibration parameters to reduce error in determination of the position of the HMD 820. Moreover, calibration performed by the tracking module 814 also accounts for information received from the IMU 827. Additionally, if tracking of the HMD 820 is lost, the tracking module 814 re-calibrates some or all of the HMD system 700.

The tracking module 814 tracks movements of the HMD 820. The tracking module 814 determines positions of a reference point of the HMD 820 using position information from fast calibration information. Additionally, in some embodiments, the tracking module 814 may use portions of the fast calibration information to predict a future location of the HMD 820. Alternatively, the tracking module 814 may use depth information generated by the DMA 300 to track movements of the HMD 820. For example, the DMA 300 generates depth information of an object that is still as to the local area surrounding the HMD 820. Using the depth information, the tracing module 814 can determine movements of the object relative to the HMD 820, which is opposite to movements of the HMD 820 in the local area. The tracking module 814 provides the estimated or predicted future position of the HMD 820 to the HMD engine 816.

The HMD engine 816 executes applications within the system environment 100 and receives depth information, position information, acceleration information, velocity information, predicted future positions, or some combination thereof of the HMD 820 from the tracking module 814. Based on the received information, the HMD engine 816 determines content to provide to the HMD 820 for presentation to the user. For example, if the received depth information indicates that an object has moved further from the HMD 820, the HMD engine 816 generates content for the HMD 820 that mirrors the object's movement in an augmented reality environment. Additionally, the HMD engine 816 performs an action within an application executing on the HMD console 810 in response to an action request received from the HMD input interface 830 and provides feedback to the user that the action was performed. The provided feedback may be visual or audible feedback via the HMD 820 or haptic feedback via the HMD input interface 830.

Alternative Embodiment

In addition to determining depth information of objects in a local area, the DMA 300 described herein can also be used to track orientations one or more eye of a user of a HMD. To track the eye, the DMA 300 is positioned in a way that a pulsed illuminator assembly of the DMA can illuminate an eye with pulses of structured light and a depth camera assembly of the DMA 300 can capture pulses of structured light reflected from the eye to generate image data of the eye (and specifically cornea of the eye). The DMA 300 may be positioned either on-axis along the user's vision or can be placed off-axis from the user's vision. Based on the image data of the eye, a controller of the DMA 300 generates depth information of the eye and tracks orientations of the eye. In some embodiment, the pulsed illuminator assembly of the DMA 300 includes two structured light projectors that projects pulses of structured light towards each of the two eyes of the user, the depth camera assembly collects pulses of structured light reflected from both the eyes, and the controller can therefore track orientations of both the eyes. For tracking a human eye, pulsing illuminator is safer than continuous illumination because emission duty cycle of the pulsed illuminator assembly is less than 100% and can meet safety standard for human eyes.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth measurement assembly (DMA) comprising:
a plurality of structured light projectors including a first structured light projector and a second structured light projector, the plurality of structured light projectors configured to project pulses of structured light into a local area in accordance with depth instructions, each of the first structured light projector and the second structured light projector configured to project respective pulses of structured light at a different time such that while the first structured light projector emits first pulses of structured light into the local area the second structured light projector does not emit second pulses of structured light into the local area, and while the second structured light projector emits the second pulses of structured light into the local area the first structured light projector does not emit the first pulses of structured light into the local area;
a depth camera assembly configured to capture image data of a portion of the local area illuminated with the first pulses of structured light and the second pulses of structured light in accordance with the depth instructions; and
a controller configured to:
generate the depth instructions;
provide the depth instructions to the depth camera assembly and the plurality of structured light projectors, and
determine depth information of an object in the local area based in part on the image data.

2. The DMA of claim 1, wherein the depth camera assembly comprises a plurality of photodiodes, each photodiode includes a first storage region and a second storage region, photoelectrons corresponding to light captured during an exposure duration of the depth camera assembly are stored in the first storage region, and photoelectrons corresponding to light captured outside the exposure duration of the depth camera assembly are stored in the second storage region.

3. The DMA of claim 2, wherein the controller is further configured to subtract image data read out from the second storage region from image data read out from the first storage region.

4. The DMA of claim 1, wherein the depth camera assembly comprises a detector configured to collect pulses of structured light reflected from the object in synchronization with projection of the pulses of structured light of the plurality of structured light projectors.

5. The DMA of claim 4, wherein the controller is configured to determine the depth information based on phase-shifted patterns of the reflected structured light distorted by shapes of the object.

6. The DMA of claim 4, wherein for each pulse of the pulses of structured light projected by the plurality of structured light projectors, the detector is configured to take one or more exposures during an exposure duration that is same as or longer than duration of the pulse.

7. The DMA of claim 6, wherein the detector comprises a tunable filter that is inactive during each exposure duration and active outside exposure durations of the detector.

8. The DMA of claim 1, wherein the pulses of structured light have a peak power that is greater than a power of ambient light within the local area.

9. The DMA of claim 1, wherein the depth instructions include a frequency of the pulses of structured light, and the controller is further configured to determine the frequency based on a threshold amount of heat accumulated in a vicinity of the plurality of structured light projectors during operation of the DMA.

10. The DMA of claim 1, wherein the captured image data comprises separate image data for each structured light projector.

11. The DMA of claim 1, wherein each structured light projector of the plurality of structured light projectors includes a pulsed illuminator, a diffractive optical element, and a projection assembly.

12. The DMA of claim 1, wherein the plurality of structured light projectors alternatively project the respective pulses of structured light.

13. The DMA of claim 1, wherein the pulses of structured light have a frequency in a range from 100 kHz to 200 MHz.

14. The DMA of claim 1, wherein the pulses of structured light have a pulse duration in a range from 100 ps to 100 ns.

15. The DMA of claim 1, wherein the controller is configured to determine the depth information using a ratio of charge between storage regions associated with each photodiode of the depth camera assembly.

16. The DMA of claim 1, wherein the controller is further configured to use triangulation calculation to obtain a depth map of the local area.

17. The DMA of claim 1, wherein the depth instructions comprise one or more pulse parameters for the plurality of structured light projectors.

18. The DMA of claim 17, wherein the one or more pulse parameters include pulse rate, pulse length, pulse wavelength, pulse amplitude, some other parameters that control how the respective pulses of structured light are emitted by the pulsed illuminator assembly, or some combination thereof.

19. The DMA of claim 1, wherein the depth instructions comprise an exposure rate and an exposure duration for the depth camera assembly.

20. The DMA of claim 1, wherein the respective pulses of structured light projected by each respective structured light projector are formed by interference of two or more beams of pulsed light.

* * * * *